United States Patent
Shigemori et al.

(10) Patent No.: US 11,429,357 B2
(45) Date of Patent: Aug. 30, 2022

(54) SUPPORT DEVICE AND NON-TRANSIENT COMPUTER-READABLE RECORDING MEDIUM RECORDING SUPPORT PROGRAM

(71) Applicant: OMRON Corporation, Kyoto (JP)

(72) Inventors: Yutsuka Shigemori, Kusatsu (JP); Mark Furseman, Fareham (GB); Nick Apps, Fareham (GB)

(73) Assignee: OMRON Corporation, Kyoto (JP)

( * ) Notice: Subject to any disclaimer, the term of this patent is extended or adjusted under 35 U.S.C. 154(b) by 12 days.

(21) Appl. No.: 17/253,119

(22) PCT Filed: Jul. 10, 2019

(86) PCT No.: PCT/JP2019/027337
§ 371 (c)(1),
(2) Date: Dec. 17, 2020

(87) PCT Pub. No.: WO2020/026737
PCT Pub. Date: Feb. 6, 2020

(65) Prior Publication Data
US 2021/0263715 A1  Aug. 26, 2021

(30) Foreign Application Priority Data
Jul. 30, 2018  (JP) .............................. JP2018-142645

(51) Int. Cl.
*G06F 8/38* (2018.01)
*G06F 9/451* (2018.01)
*G06F 8/70* (2018.01)

(52) U.S. Cl.
CPC .................. *G06F 8/38* (2013.01); *G06F 8/70* (2013.01); *G06F 9/451* (2018.02)

(58) Field of Classification Search
CPC ...................................................... G06F 3/048
See application file for complete search history.

(56) References Cited

U.S. PATENT DOCUMENTS 9,674,963 B1 * 6/2017 Sari ....................... B65G 43/00
10,564,988 B1 * 2/2020 Jose ....................... G06F 9/546
(Continued)

FOREIGN PATENT DOCUMENTS

JP  2006164258  6/2006
JP  2012194845  10/2012
(Continued)

OTHER PUBLICATIONS

"International Search Report (Form PCT/ISA/210) of PCT/JP2019/027337", dated Sep. 10, 2019, with English translation thereof, pp. 1-3.
(Continued)

Primary Examiner — Di Xiao
(74) Attorney, Agent, or Firm — JCIPRNET

(57) ABSTRACT

The objective of the present invention is to diversify the types of OS compatible with constituent elements of an HMI program. A support device receives a specification of UI elements of program code compatible with a first OS type, said UI elements constituting an HMI program executed by control devices which are targets of factory automation (FA); generates program code of UI elements compatible with a second OS type from the specified UI elements; and generates a wrapper program, which includes the program code compatible with the second OS type and an instruction code instructing to generate an execution module that includes the relevant program code, when a condition that the OS possessed by the target device is not the first OS type is satisfied. A program in executable code is generated from the HMI program having the wrapper program incorporated therein.

7 Claims, 14 Drawing Sheets

(56) References Cited

U.S. PATENT DOCUMENTS

| | | | |
|---|---|---|---|
| 2003/0070061 A1 | 4/2003 | Wong et al. | |
| 2012/0284631 A1 | 11/2012 | Lancioni et al. | |
| 2016/0034276 A1 | 2/2016 | Webb | |
| 2017/0091159 A1* | 3/2017 | Su | G06F 40/205 |
| 2017/0102976 A1* | 4/2017 | Nandakumar | G06F 9/547 |
| 2018/0018154 A1* | 1/2018 | Burns | G06F 8/61 |

FOREIGN PATENT DOCUMENTS

| | | |
|---|---|---|
| JP | 2015524126 | 8/2015 |
| JP | 2018045544 | 3/2018 |

OTHER PUBLICATIONS

"Written Opinion of the International Searching Authority (Form PCT/ISA/237) of PCT/JP2019/027337", dated Sep. 10, 2019, with English translation thereof, pp. 1-6.
"Search Report of Europe Counterpart Application", dated Mar. 21, 2022, p. 1-p. 8.

* cited by examiner

```
                                                      ┌─425B
                                                      │
    public class _converted_SampleControl
    {
        private int _left;                          ─425H
        public _ converted_SampleControl()
        {
            if (OS.Environment == Windows)
  425E:     _target = new SampleControl();
            else                                    ─500
                _target = null;
        } public int Left
        {
            get
            {
                if (_target)
                {
                    return _target->Left;
                }
                return _left;
            }
            set                                     ─425G
            {
                if (_target)
                {
                    _target->Left = value;
                }
                else
                    _left = 0;
            }
        }
    }
```

Generating →

FIG. 9

```
Internal code class Page
{
    Control _content = new
_converted_SampleControl();

}
```

SUPPORT DEVICE AND NON-TRANSIENT COMPUTER-READABLE RECORDING MEDIUM RECORDING SUPPORT PROGRAM

CROSS-REFERENCE TO RELATED APPLICATION

This application is a 371 application of the International PCT application serial no. PCT/JP2019/027337, filed on Jul. 10, 2019, which claims the priority benefits of Japan Patent Application No. 2018-142645, filed on Jul. 30, 2018. The entirety of each of the above-mentioned patent applications is hereby incorporated by reference herein and made a part of this specification.

BACKGROUND

Technical Field

The disclosure relates to a support device and a non-transient computer-readable recording medium recording development support program which support the development of factory automation (FA) programs.

Description of Related Art

FA technology using a control device such as a programmable logic controller (PLC) is widely used in various production sites. With the development of information and communication technology (ICT) in recent years, control devices in the FA field are becoming more sophisticated and highly functional.

Along with this, in the development of various programs related to FA control, for example, there is a desire to use an external control provided in the development environment of the application program compatible with the operating system (OS) of Windows (registered trademark) as user interface (UI) elements that configure an application program compatible with non-Windows OS for FA. For example, there is a desire to use an external control as UI elements that configure a human-machine interface (HMI) program for providing a UI screen for monitoring or controlling the state of a field device via a control device.

Patent Document 1 (Japanese Patent Laid-Open No. 2015-524126) discloses that a platform-independent source code among source codes is extended with one or more parts of the source code annotated for different platforms and/or versions.

RELATED ART

Patent Document

[Patent Document 1] Japanese Laid-Open No. 2015-524126

SUMMARY

Technical Problem

Patent Document 1 discloses the extension of the source code but does not disclose a technique for making an external control compatible with a general-purpose OS available as UI elements configuring a program compatible with a non-general-purpose OS.

The disclosure provides an environment for supporting program development that enables diversification without limiting the types of OSs compatible with configuring elements of the HMI program.

Solution to the Problem

A support device according to an embodiment of the disclosure is a support device which supports development of a human machine interface (HMI) program to be executed by a target device of factory automation (FA). The support device includes: a receiving part which receives specification of a user interface (UI) element configuring the HMI program with a program code compatible with a first type of operation system (OS); a code generation part which generates a program code of a UI element compatible with a second type of OS from the specified UI element; and a wrapper generation part which generates a wrapper program including the generated program code compatible with the second type of OS and an instruction code which instructs to generate an execution module that includes the program code when a condition that an OS possessed by the target device is not the first type of OS is satisfied, and a program in executable code is generated from the HMI program in which the wrapper program is incorporated as a UI element with the program code compatible with the first type of OS.

According to this disclosure, it is possible to realize a program development support environment that enables parallel development of an HMI program configured by the UI element compatible with the first type of OS and an HMI program configured by the UI element compatible with the second type of OS including the OS, as configuring elements of the HMI program.

As a result, if the first type of OS is a general-purpose OS, the UI elements provided in the development environment of the application compatible with the general-purpose OS can be used for the development of the HMI program in the FA field.

In the above disclosure, the wrapper generation part further includes, in the instruction code, a code which instructs to generate an execution module of an HMI program including the UI element with the program code compatible with the first type of OS when a condition that the OS possessed by the target device is the first type of OS is satisfied.

According to this disclosure, when the HMI program is executed by the target device, when the target device has the first type of OS, the execution module of the HMI program including the UI element with the program code compatible with the first type of OS is generated, and when the target device has the second type of OS, the execution module of the HMI program including the UI element with the program code compatible with the second type of OS is generated.

In this way, the execution module compatible with the first type of OS and the execution module compatible with the second type of OS can be generated from the program code of one HMI program. Therefore, one HMI program compatible with various types of OS can be generated without preparing both a program development environment compatible with the first type of OS and a program development environment compatible with the second type of OS.

In the above disclosure, the code generation part extracts a property which matches a property of the UI element with the program code compatible with the second type of OS from a property of the UI element with the program code compatible with the first type of OS, and generates the UI element with a program code compatible with the second type of OS from a UI element with a program code including the extracted property.

According to the above disclosure, the the UI element with program code compatible with the second type of OS is generated by using the property of the UI element with the program code compatible with the first type of OS. Therefore, it is possible to generate the UI element with the program code compatible with the second type of OS without requiring new information.

In the above disclosure, the support device further includes: a part which outputs a list of selection candidates of the UI elements; and a registration part which registers the UI element with the program code compatible with the first type of OS received by the receiving part in the list, and the HMI program is edited by using a UI element selected by a user from the list.

According to the above disclosure, the user can register the UI element with the program code compatible with the first type of OS in the list of the selection candidates of the UI elements, whereby the UI element can be selected from the list, and the selected UI element can be used as a UI element configuring the HMI program.

In the above disclosure, the wrapper generation part generates the wrapper program when the program in executable code is generated.

According to the above disclosure, the wrapper program can be generated when the program in executable code of the edited HMI program is generated.

In the above disclosure, the wrapper generation part generates the wrapper program when the UI element with the program code compatible with the first type of OS is registered in the list by the registration part.

According to the above disclosure, the wrapper program can be generated when the UI element with the program code compatible with the first type of OS is registered in the list.

In the above disclosure, the code generation part generates the UI element with a program code compatible with the second type of OS from the specified UI element when a type of the OS possessed by the target device is not the first type of OS.

According to the above disclosure, if the type of OS of the target device corresponds to the first type, the generation of the program code by the code generation part and the generation of the wrapper program by the wrapper generation part can be omitted.

A non-transient computer-readable recording medium, recording a support program according to an embodiment of the disclosure is a support program which supports development of a human machine interface (HMI) program to be executed by a target device of factory automation (FA). The support program is configured to make a computer execute: receiving specification of a user interface (UI) element configuring the HMI program with a program code compatible with a first type of operation system (OS); generating a program code compatible with a second type of OS from the specified UI element; generating a wrapper program including the generated program code compatible with the second type of OS and an instruction code which instructs to generate an execution module that includes the program code when a condition that an OS possessed by the target device is not the first type of OS is satisfied; and generating a program in executable code from the HMI program in which the wrapper program is incorporated as a UI element with the program code compatible with the first type of OS.

According to this disclosure, it is possible to realize a program development support environment that enables parallel development of an HMI program configured by the UI element compatible with the first type of OS and an HMI program configured by the UI element compatible with the second type of OS including the OS, as configuring elements of the HMI program.

As a result, if the first type of OS is a general-purpose OS, the UI elements provided in the development environment of the application compatible with the general-purpose OS can be used for the development of the HMI program in the FA field.

Effects

According to the disclosure, it is possible to provide a program development support environment that enables diversification without limiting the types of OSs compatible with the configuring elements of the HMI program.

BRIEF DESCRIPTION OF THE DRAWINGS

FIG. 9 is a diagram schematically showing an example of an I/F conversion object according to an embodiment of the disclosure.

DESCRIPTION OF THE EMBODIMENTS

Figure 1:
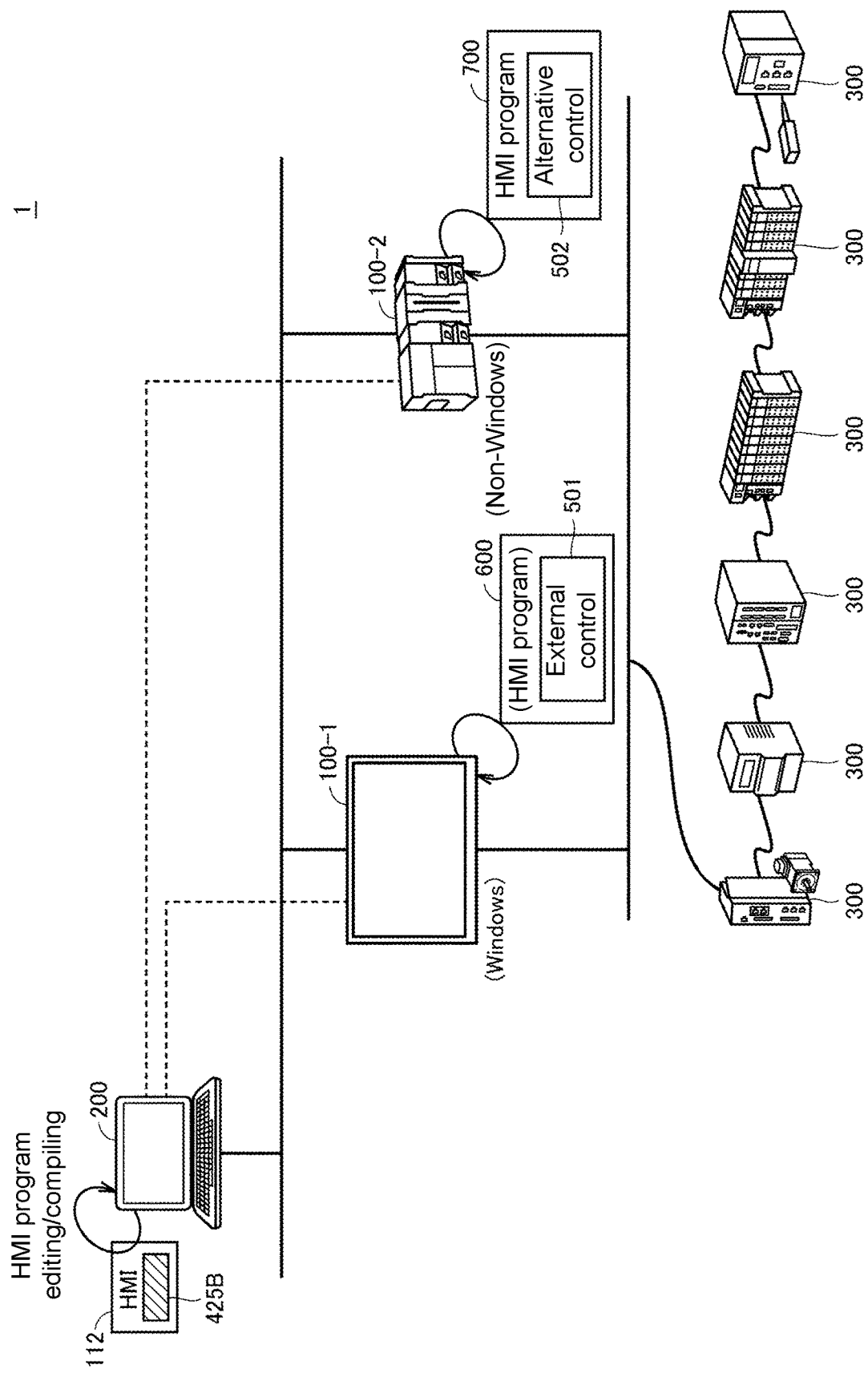
FIG. 1 is a diagram schematically showing a configuration of a system according to an embodiment of the disclosure.

Embodiments of the disclosure will be described in detail with reference to the drawings. Further, in the drawings, the same or corresponding parts are denoted by the same reference numerals and descriptions thereof will not be repeated.

A. APPLICATION EXAMPLE

First, an example of a scenario where the disclosure is applied is described with reference to FIG. 1. FIG. 1 is a diagram schematically showing a configuration of a system 1 according to an embodiment of the disclosure. A support device 200 according to the embodiment is a device that supports the development of an HMI program to be executed by a target device of FA, and for example, a general-purpose computer can be applied. The target device includes an industrial computer (IPC) 100-1 and a PLC 100-2 as control devices. The control device controls a device 300 (for example, a manufacturing device or equipment) provided in any field and serving as a control target.

The support device 200 edits an HMI program 112 and compiles the edited HMI program 112. By compiling, an execution format program configured by a program code executable by the target device is generated from the HMI program 112. The target device displays an HMI screen by executing the execution format HMI program 112 transferred from the support device 200.

When the support device 200 receives specification of user interface (UI) elements of a program code compatible with a first type of OS from a user (the UI elements configuring the HMI program 112), the support device 200 generates a program code of UI elements compatible with a second type of OS from the specified UI elements. The support device 200 generates an I/F conversion object 425B corresponding to a wrapper program including the generated program code compatible with the second type of OS and an instruction code which instructs to generate an execution module that includes the relevant program code when a condition that the OS possessed by the target device is not the first type of OS is satisfied. At the time of compiling, the support device 200 generates an executable format program from the HMI program 112 in which the above wrapper program (I/F conversion object 425B) is incorporated as UI elements of the program code compatible with the first type of OS.

In the configuration of FIG. 1, when the HMI program 112 is transferred from the support device 200 to the target device and executed by the target device, by executing the wrapper program, when the target device has the first type of OS, for example, in the IPC 100-1, an execution module 600 of the HMI program including the UI elements (for example, an external control 501) of the program code compatible with the first type of OS is generated. Further, when the target device has the second type of OS, for example, in the PLC 100-2, an execution module 700 of the HMI program including the UI elements (an alternative control 502 of the external control 501) of the program code compatible with the second type of OS is generated.

By executing the wrapper program in this way, an execution module compatible with Windows including the external control 501 and an execution module compatible with a non-Windows OS including the alternative control 502 instead of the external control 501 can be generated from the source code of the same HMI program 112.

In this way, in the support device 200, the HMI program 112 compatible with the types of OS possessed by the target device can be developed without preparing both a program development environment compatible with the first type of OS and a program development environment compatible with the second type of OS.

The first type of OS described above is typically a general-purpose OS such as Windows (registered trademark), and the second type of OS is a type of OS different from the first type of OS, and typically is an OS applied to a program for FA. For example, non-Windows Linux (registered trademark), UNIX (registered trademark) and the like are included. Further, the first type of OS and the second type of OS may be different versions of the OS. For example, the first type of OS may be Windows 10 (registered trademark), and the second type of OS may be Windows CE (registered trademark).

Further, in the embodiment, the program (or program code) compatible with the OS indicates a program or program code having a code system that is interpretable and executable under the OS.

Hereinafter, the development environment of the HMI program provided by the support device 200 according to the embodiment will be described in detail as a more specific application example of the disclosure.

B. SYSTEM CONFIGURATION

FIG. 1 is a diagram schematically showing a configuration of a system according to an embodiment of the disclosure. With reference to FIG. 1, the system 1 of FA network-connects the industrial computer (IPC) 100-1 and the PLC 100-2 as control devices, multiple devices 300, and the support device 200. The control device is a kind of computer, and a user program such as a control program designed according to a manufacturing device, a manufacturing equipment or the like is executed in the control device. Such a user program is developed by the support device 200 as a development environment prepared separately from the control devices.

The support device 200 is, for example, a general-purpose computer, and provides an environment for integrating and developing various programs of the system 1 and also provides a function of transferring the user program to the control devices. Hereinafter, the IPC 100-1 and the PLC 100-2 are collectively referred to as a control device 100. The devices 300 network-connect a field device (now shown) serving as a control target. The control target may include, for example, a sensor, an actuator and the like.

A transmission line conforming to, for example, the universal serial bus (USB) is adopted between the support device 200 and the control device 100. For the transmission line of the control device 100 and the devices 300, for example, it is preferable to adopt a bus or network in which the arrival time of data is guaranteed conforming to the time-sensitive network (TSN) standard. For example, EtherCAT (registered trademark), which is an example of a network for machine control, may be adopted.

The user program developed in the support device 200 includes various programs such as a control program for the control device 100 to perform a control calculation for controlling the devices 300 and an HMI program for performing an HMI process. These user programs may include programs compatible with non-Windows such as Linux (registered trademark) and UNIX (registered trademark) or programs compatible with Windows, and the types of OSs are not limited thereto. The developed program is transferred from the support device 200 to the control device 100 and executed by the processor of the control device 100.

The control calculation includes a process of processing data collected or generated by the devices 300 from the field device, a process (calculation process) of generating data such as an instruction to the devices 300, a process (output process) of transmitting the generated output data to the target devices 300, and the like.

The HMI process includes processes of collecting information such as the states of various FA devices (the control device 100, the devices 300, and the field device), outputting the collected information on the HMI screen, and receiving user setting (setting of instructions, values, and the like) operations for operating various devices via the HMI screen, and the like.

Further, in the system 1 shown in FIG. 1, the support device 200 is provided as a separate body from the control device 100, but the support device 200 may be provided integrally with the control device 100. That is, the function of the support device 200 may be built in the control device 100.

C. EXAMPLE OF HARDWARE CONFIGURATION OF CONTROL DEVICE 100

Figure 2:
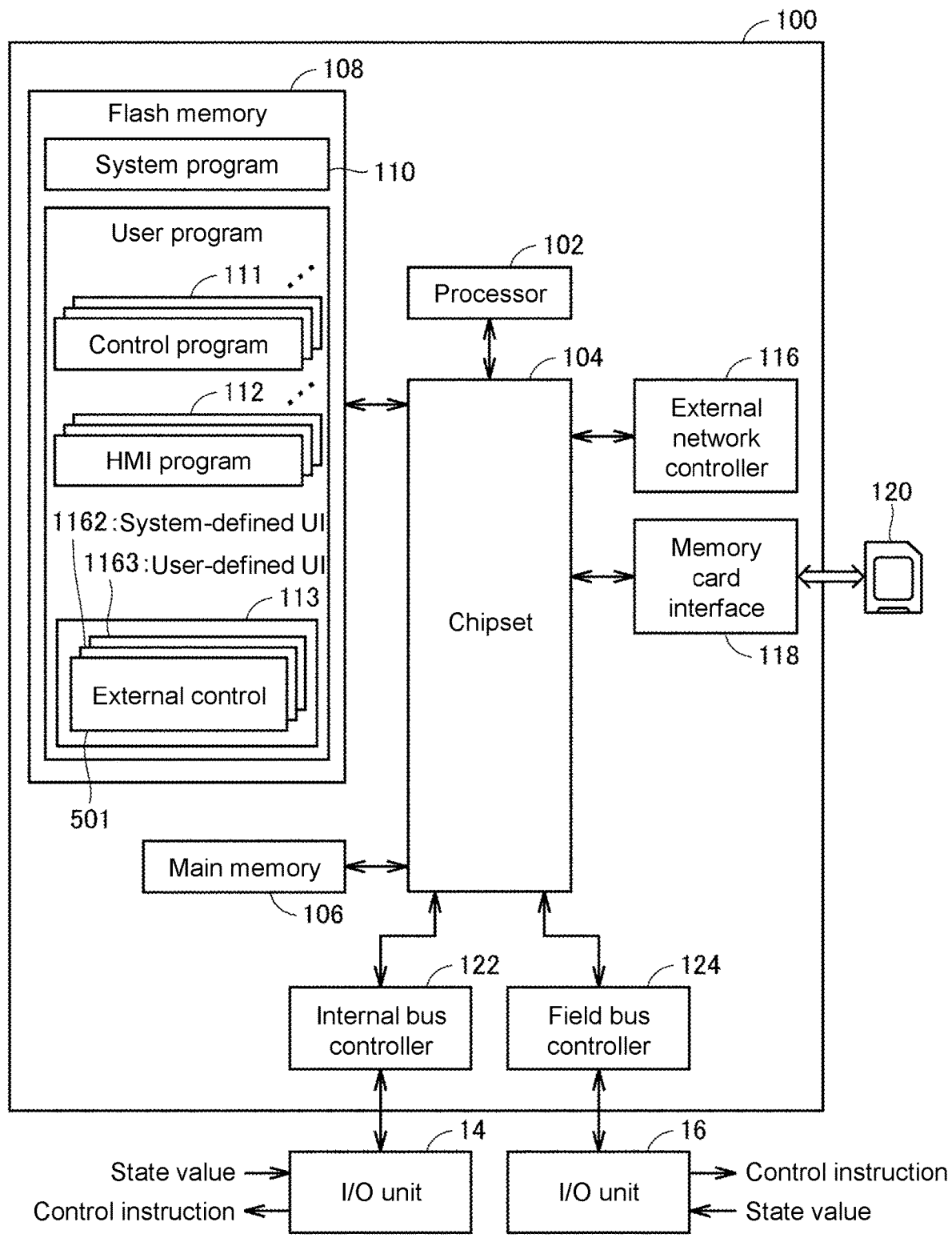
FIG. 2 is a diagram schematically showing an example of a hardware configuration of the control device 100 according to an embodiment of the disclosure.

FIG. 2 is a diagram schematically showing an example of a hardware configuration of the control device 100 according to an embodiment of the disclosure. With reference to FIG. 2, the control device 100 includes a processor 102, such as a central processing unit (CPU) or a micro-processing unit (MPU), a chipset 104, a main memory 106, a flash memory 108, an external network controller 116, a memory card interface 118, an internal bus controller 122, and a field bus controller 124.

The processor 102 reads a system program 110 and a user program stored in the flash memory 108, expands them in the main memory 106, and executes them to realize the control process or the HMI process for the control target such as the devices 300 or the field device.

Figure 5:
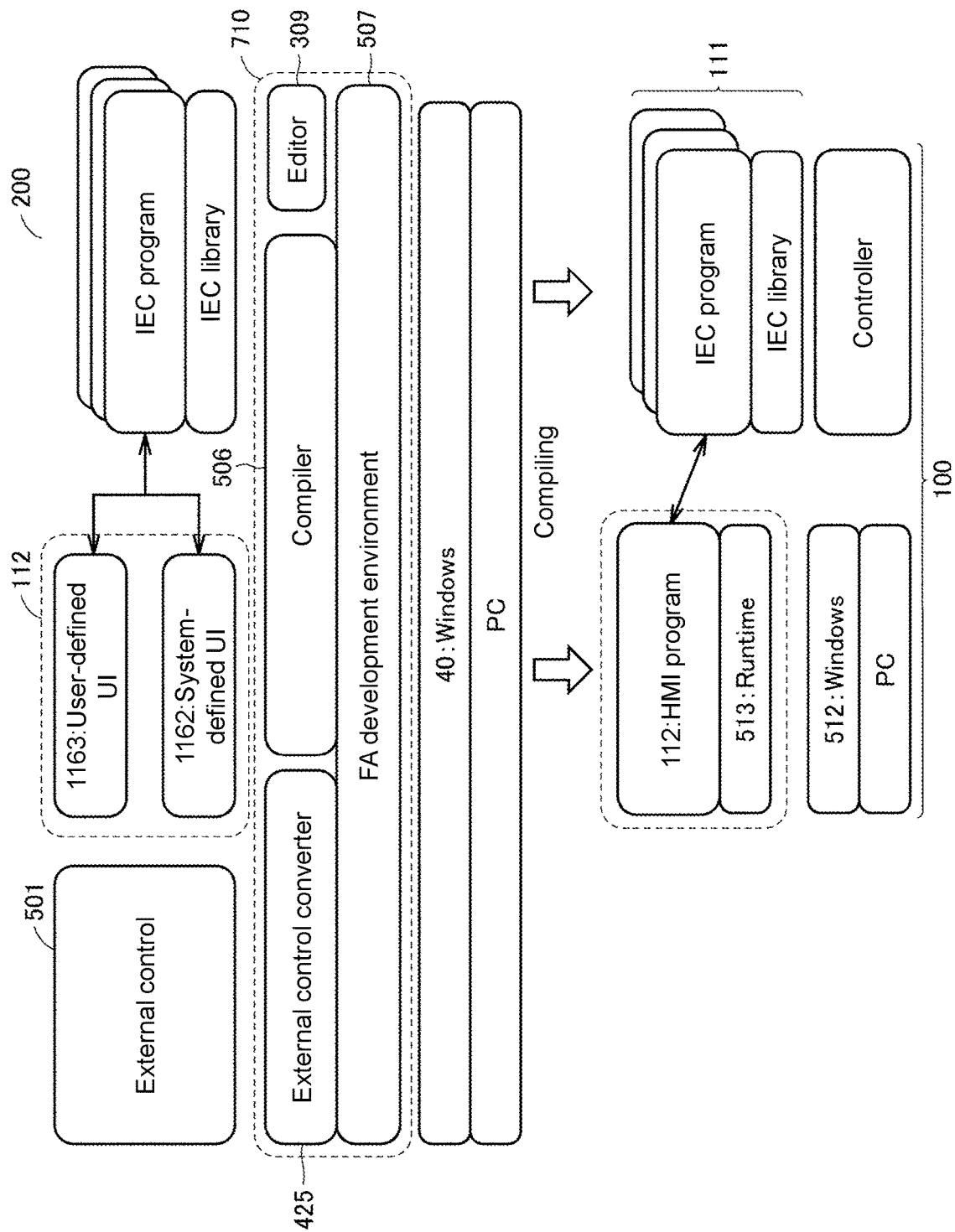
FIG. 5 is a diagram schematically showing a specific configuration example of the development environment and the execution environment in the support device 200 according to an embodiment of the disclosure.

The system program 110 includes an instruction code for providing basic functions of the control device 100 such as the data input/output process and the execution timing control. The user program includes a control program 111, an HMI program 112, and a library 113 that are designed as desired according to the control target. The control program 111 includes a sequence program for executing sequence control, a motion program for executing motion control, and the like. The HMI program 112 includes, for example, a program corresponding to each HMI screen. In the library 113, unit programs such as the external control 501, user interface (UI) elements configuring the HMI program, and functions configuring the control program are registered in the form of executable codes (for example, intermediate codes). The UI elements include the executable codes of a user-defined UI 1163 defined by the user and a system-defined UI 1162 defined by the system as shown in FIG. 5 (to be described later).

The chipset 104 realizes processes of the control device 100 as a whole by controlling each component.

The internal bus controller 122 is an interface for exchanging data between the control device 100 and an I/O unit 14 connected through an internal bus. The field bus controller 124 is an interface for exchanging data between the control device 100 and an I/O unit 16 connected through a field bus (not shown). The internal bus controller 122 and the field bus controller 124 obtain state values input to the corresponding I/O units 14 and 16, respectively, and output calculation results of the processor 102 as instruction values from the corresponding I/O units 14 and 16, respectively.

The external network controller 116 controls the exchange of data through various wired/wireless networks. The memory card interface 118 is configured to allow a memory card 120 to be attached thereto or detached therefrom, and is capable of writing data to the memory card 120 and reading data from the memory card 120. The control device 100 exchanges data with the support device 200 via the external network controller 116 or the memory card interface 118.

A part or all of the functions provided by the control device 100 executing the programs may be implemented as a dedicated hardware circuit.

D. EXAMPLE OF HARDWARE CONFIGURATION OF SUPPORT DEVICE 200

Figure 3:
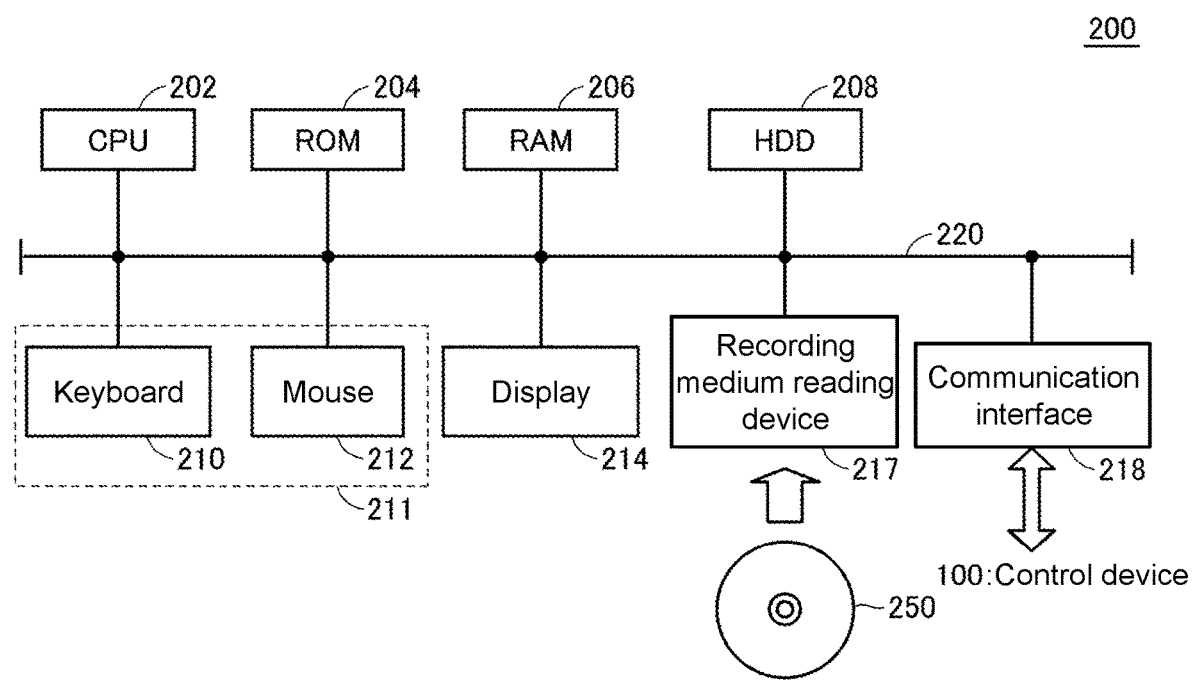
FIG. 3 is a diagram schematically showing an example of a hardware configuration of the support device 200 according to an embodiment of the disclosure.

Next, an example of a hardware configuration of the support device 200 will be described. FIG. 3 is a diagram schematically showing an example of a hardware configuration of the support device 200 according to an embodiment of the disclosure. With reference to FIG. 3, the support device 200 may be a stationary type, or may be provided in the form of a notebook type personal computer having good portability at the manufacturing site where the control device 100 is disposed.

The support device 200 includes a CPU 202 which executes various programs including an OS, a read only memory (ROM) 204 which stores a basic input output system (BIOS) and various data, a random access memory (RAM) 206 which provides a work area for storing data necessary for executing the programs by the CPU 202, and a hard disk (HDD) 208 which non-volatilely stores programs and the like executed by the CPU 202.

The support device 200 further includes an input part 211 including a keyboard 210 and a mouse 212 which receive user operations on the support device 200, and a display 214 for presenting information to the user. The support device 200 includes a communication interface 218 for communicating with the control device 100. The input part 211 may be provided as a touch panel integrally configured with the display 214.

The support device 200 includes a recording medium reading device 217 for reading a support program stored in a recording medium 250 from the recording medium 250. This support program may include a program that realizes a program development environment. Each part of the support device 200 communicates with each other via a bus 220.

E. SOFTWARE CONFIGURATION OF CONTROL DEVICE 100

Figure 15:
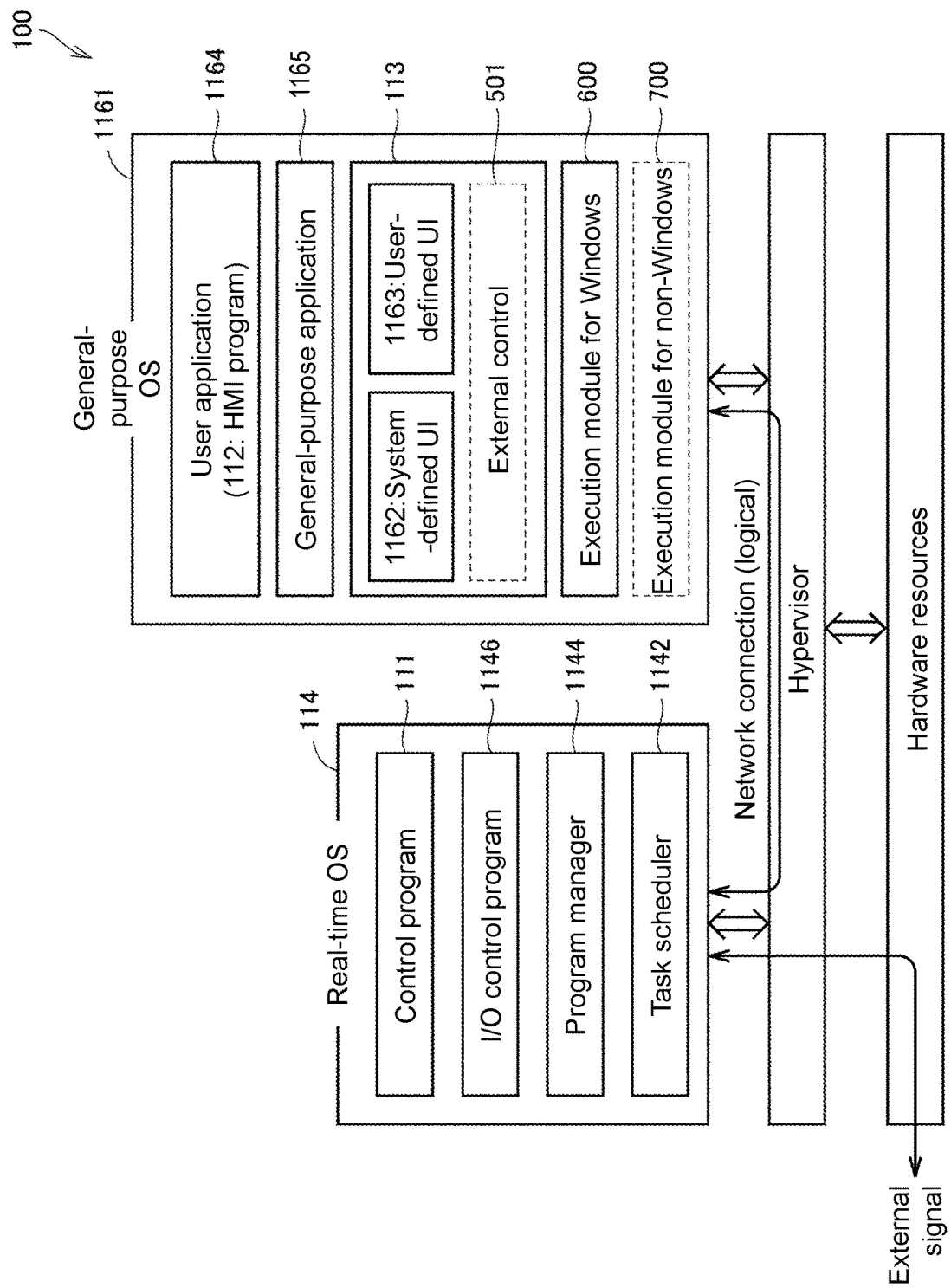
FIG. 15 is a schematic diagram showing an example of a software configuration of the control device 100 according to an embodiment of the disclosure.

FIG. 15 is a schematic diagram showing an example of a software configuration of the control device 100 according to an embodiment of the disclosure. FIG. 15 shows, for example, a configuration example of the IPC 100-1.

With reference to FIG. 15, in the control device 100, a hypervisor manages the hardware resources of the control device 100 and allocates these hardware resources to a real-time OS 114 and a general-purpose OS 1161 such as Windows 512 (to be described later) while mediating these hardware resources, so that the real-time OS 114 and the general-purpose OS 1161 are executed independently of each other on the common hardware resources. That is, a virtual environment for executing different types of OSs is realized by using the hypervisor. A logical network is configured between the real-time OS 114 and the general-purpose OS 1161 by the hypervisor.

In the real-time OS 114, the control program 111 including the sequence program is executed. A task scheduler 1142, a program manager 1144, and an input/output (I/O) control process 1146 cooperate in executing the control program 111. The control program 111 is converted into an executable code in advance, and at the time of execution, the task scheduler 1142, the program manager 1144, and the I/O control process 1146 cooperate to repeatedly obtain a signal from the control target, execute the control logic, and reflect the execution result (actuator control).

Under the general-purpose OS 1161, a user application 1164 including for example the HMI program 112, which is any user application, and a general-purpose application 1165 are executed while calling various programs of the library 113. The general-purpose application 1165 is a standard application executable by the general-purpose OS 1161, and is capable of constructing a system with fewer person-hours with use of general-purpose processes or functions in cooperation with a user application such as the HMI program 112.

The library 113 includes the system-defined UI 1162, the user-defined UI 1163, and the external control 501 in an executable format configured by an executable code.

Further, the execution module 600 compatible with the first type of OS (general-purpose OS) or the execution module 700 compatible with the second type of OS (non-general-purpose OS) may be generated under the general-purpose OS 1161.

F. DEVELOPMENT ENVIRONMENT AND EXECUTION ENVIRONMENT OF PROGRAM

Figure 4:
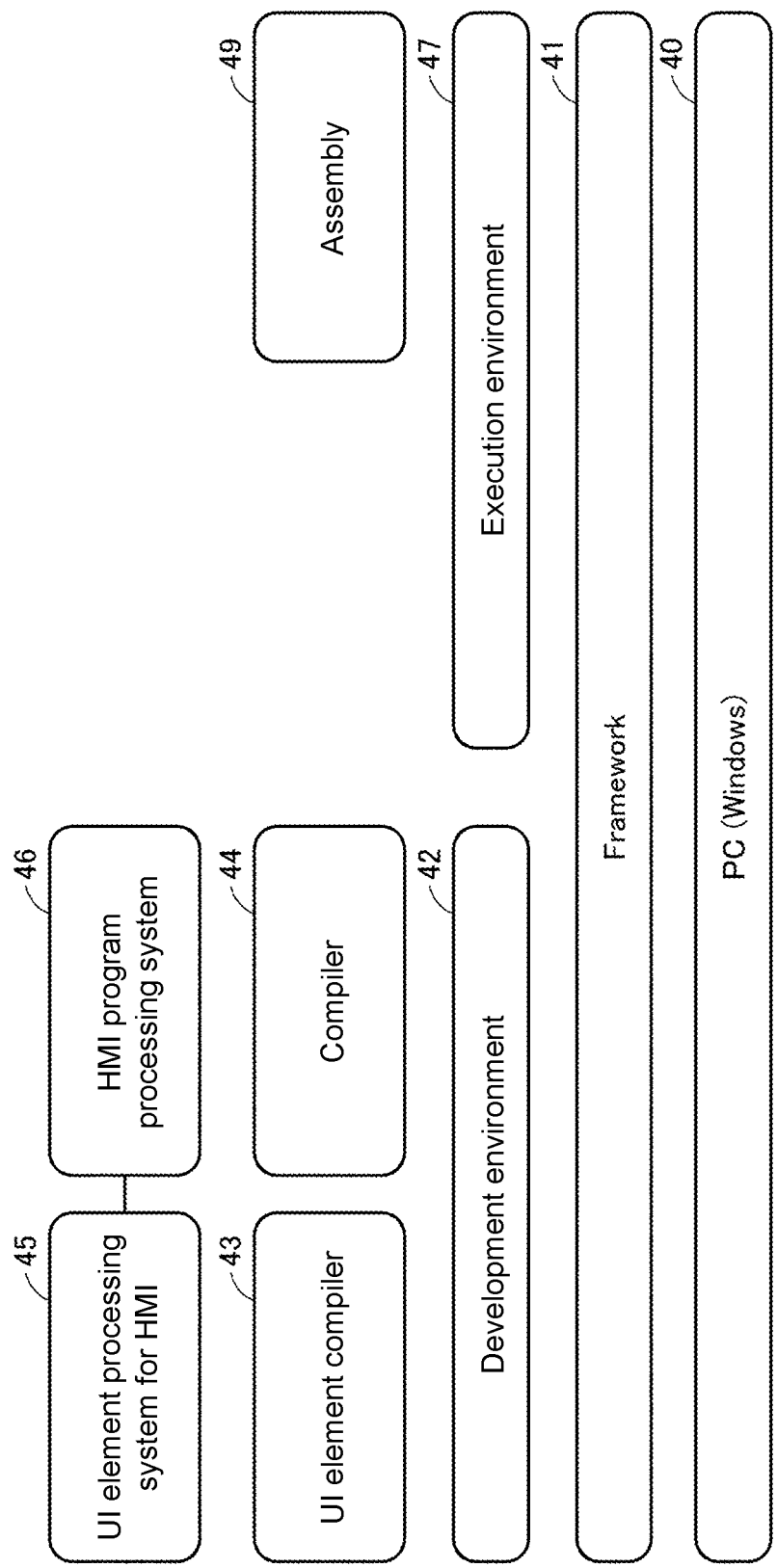
FIG. 4 is a diagram schematically showing an example of an overall configuration of a development environment and an execution environment of a program according to an embodiment of the disclosure.

FIG. 4 is a diagram schematically showing an example of an overall configuration of a development environment and an execution environment of a program according to an embodiment of the disclosure. With reference to FIG. 4, a development environment 42 is provided by the support device 200, and an execution environment 47 is provided by the control device 100. In FIG. 4, the development environment 42 and the execution environment 47 are provided in different devices, but they may be provided in the same device. Further, various programs and data configuring the development environment 42 are stored in a storage part such as the RAM 206 of the support device 200.

With reference to FIG. 4, the development environment 42 and the execution environment 47 are provided on Windows 40 and a dot net (.NET) framework 41. The development environment 42 includes, for example, an HMI program language processing system 46, a UI element processing system 45 for HMI, a UI element compiler 43, and an HMI program compiler 44 by visual basic dot net (VB.NET) script. The execution environment 47 includes an assembly 49 configured by an executable code such as a library for executing an HMI program. In the embodiment, in the development environment, a program source code generated by an editor 309 (to be described later) of the HMI language processing system and the UI element processing system 45 for HMI is compiled by the UI element compiler 43 and the compiler 44. By compiling, the source code becomes an executable format file configured by an executable code (intermediate code). In the execution environment for HMI, the compiled HMI program is made an execution module by using the assembly 49, and the execution module is executed. The execution module is provided by linking an executable format object of the UI element to the executable format HMI program 112.

FIG. 5 is a diagram schematically showing a specific configuration example of the development environment and the execution environment in the support device 200 according to an embodiment of the disclosure. With reference to FIG. 5, in the support device 200, a program which provides the development environment 42 of the HMI program 112 is executed under the Windows 40 executed under the hardware resources of a PC and also under various programs of an FA development environment 507 provided under the Windows 40. These programs include an external control converter 425, a compiler 506 and the editor 309 in the development environment 42. A support program 710, which is configured by a program for realizing the development environment of the HMI program 112, is stored in the RAM 206.

The external control converter 425 converts the external control 501, which is provided as a UI element for constructing a program compatible with Windows, into a code for making it executable under a non-Windows OS. The compiler 506 includes the compiler 43 and the compiler 44 of the UI elements of FIG. 4. The editor 309 receives a user operation and edits (creates) the HMI program 112 according to the received operation content. Further, an environment for developing the control program 111 is also provided under the FA development environment 507. The external control 501, the HMI program 112, and the control program 111 are also stored in the RAM 206.

The control program 111 includes a program and various libraries conforming to IEC, which is a programming standard for PLC. The HMI program 112 includes a user-defined UI or a system-defined UI as UI elements configuring the HMI program 112. Further, the user can select the external control 501 as a UI element configuring the HMI program 112 at the time of editing.

When the compiler 506 is started under the FA development environment 507, the HMI program 112 is compiled, whereby an executable code is generated from the source code of the HMI program 112. The HMI program 112 in executable code is transferred to the control device 100.

In the execution environment of the control device 100, a Runtime 513 launched under the Windows 512 supports the execution of the HMI program 112 in executable code. The Runtime 513 generates an execution module compatible with the Windows 512 from the HMI program 112 in executable code. By interpreting and executing the code of the execution module of the HMI program 112, the Windows 512 performs an HMI process such as presenting an HMI screen including various UI elements.

Further, the executable code of the compiled control program 111 is interpreted and executed by the real-time OS 114, and the control process is executed.

In the control device 100, data can be exchanged between the HMI program 112 which executes the HMI process and the control program 111 which executes the control process via their OSs and a logical network (see FIG. 15). As a result, for example, in the execution environment, a state (such as outputs of a sensor) of the field device, which is a control target, obtained by the control process can be presented by a display mode (for example, display color) of the UI elements of the HMI screen. Further, the data input by operating the UI elements of the HMI screen can be used as data for changing the state of the field device, which is a control target, by the control process.

G. CONFIGURATION FOR EXTERNAL CONTROL CONVERSION

Figure 6:
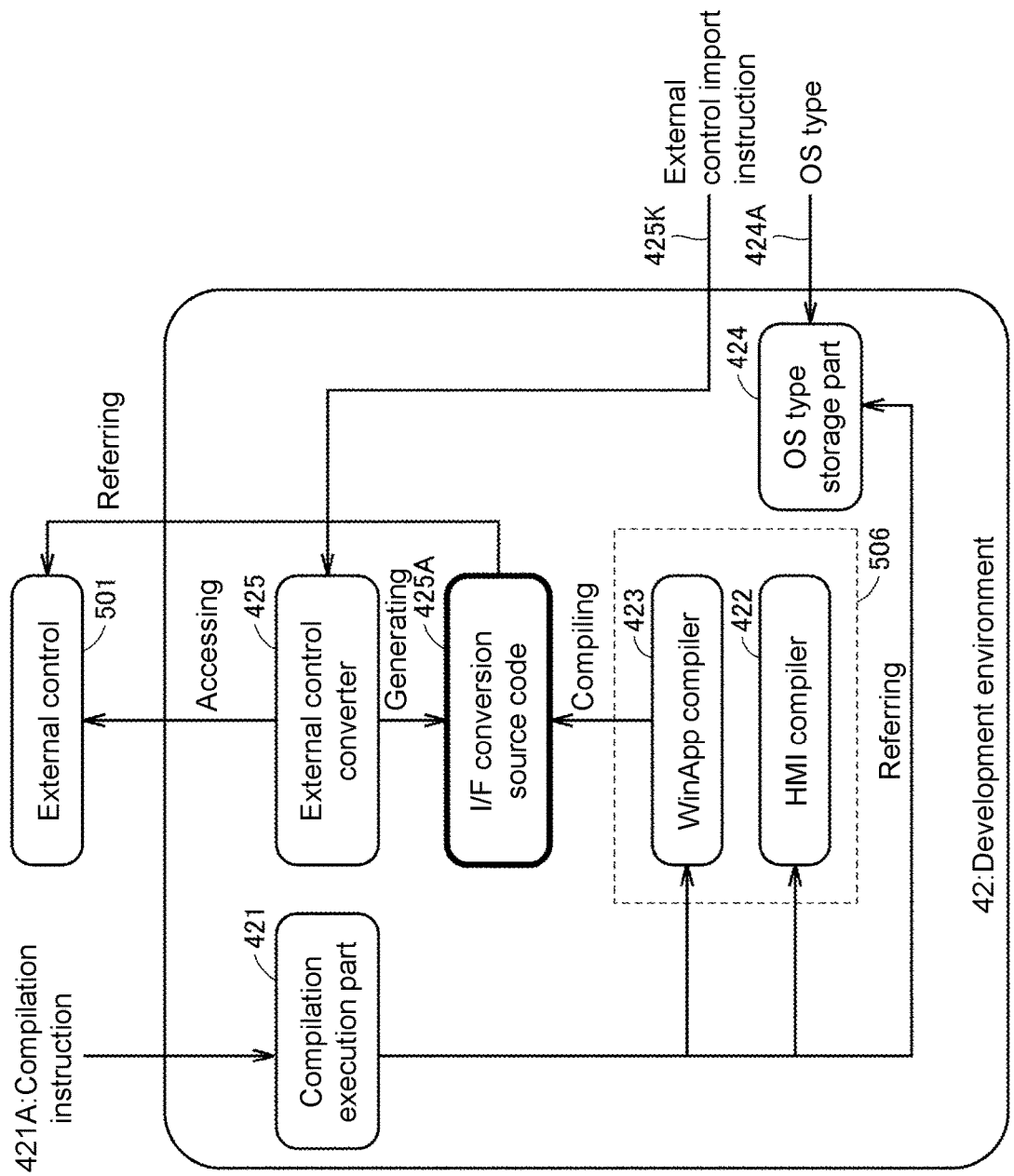
FIG. 6 is a diagram schematically showing an example of a module configuration for a conversion process of an external control according to an embodiment of the disclosure.

FIG. 6 is a diagram schematically showing an example of a module configuration for a conversion process of an external control according to an embodiment of the disclosure. With reference to FIG. 6, the development environment 42 includes a compilation execution part 421 which starts the compiler 506, an OS type storage part 424, and an external control converter 425 according to a compilation instruction 421A received from the user operation via the input part 211. The compiler 506 includes an HMI compiler 422 which compiles the HMI program 112 configured by UI elements, and a WinApp compiler 423 which compiles the external control 501.

The OS type storage part 424 obtains an OS type 424A of the control device 100 and holds (stores) it in a memory such as the RAM 206. The OS type storage part 424 obtains the OS type 424A from the content of the user operation via the input part 211 or by receiving it from the control device 100. In order to obtain the OS type 424A, the support device 200 communicates with the control device 100 conforming to a communication protocol such as the hypertext transfer protocol (HTTP).

When the external control converter 425 receives an import instruction 425K of the external control 501 according to the user operation via the input part 211, the external control converter 425 accesses the external control 501 stored in the RAM 206, generates an interface (I/F) conversion source code 425A from the code of the external control 501 and stores it in the RAM 206. The I/F conversion source code 425A includes a code in which the source code of the I/F part of the external control 501 compatible with Windows is made compatible with the UI element of non-Windows. Details of the operation of each part of FIG. 6 will be described later in the description of FIG. 12.

H. EDITING PROCESS

Figure 7:
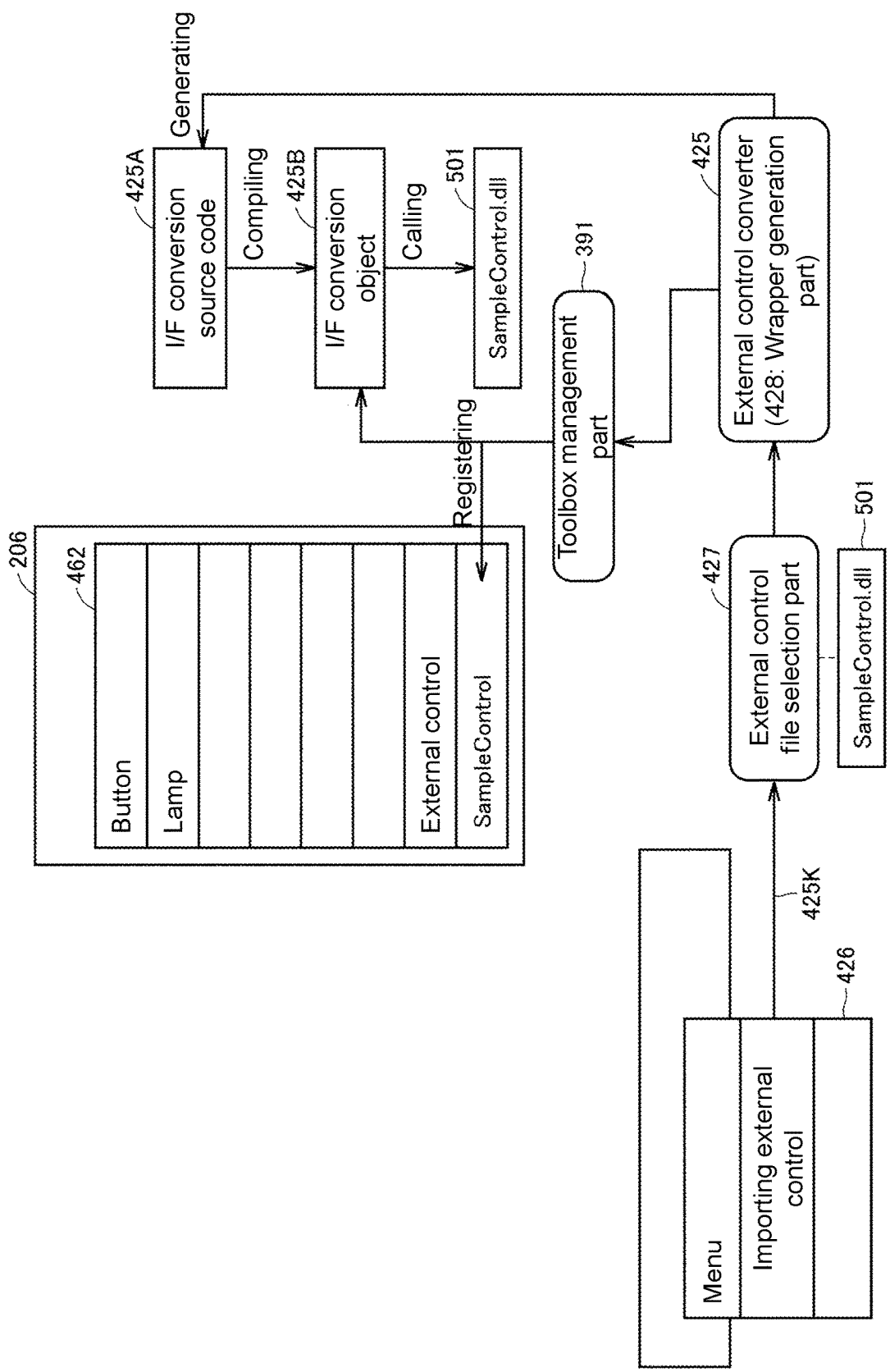
FIG. 7 is a diagram schematically showing an outline of a toolbox management process according to an embodiment of the disclosure.
Figures 10, 11:
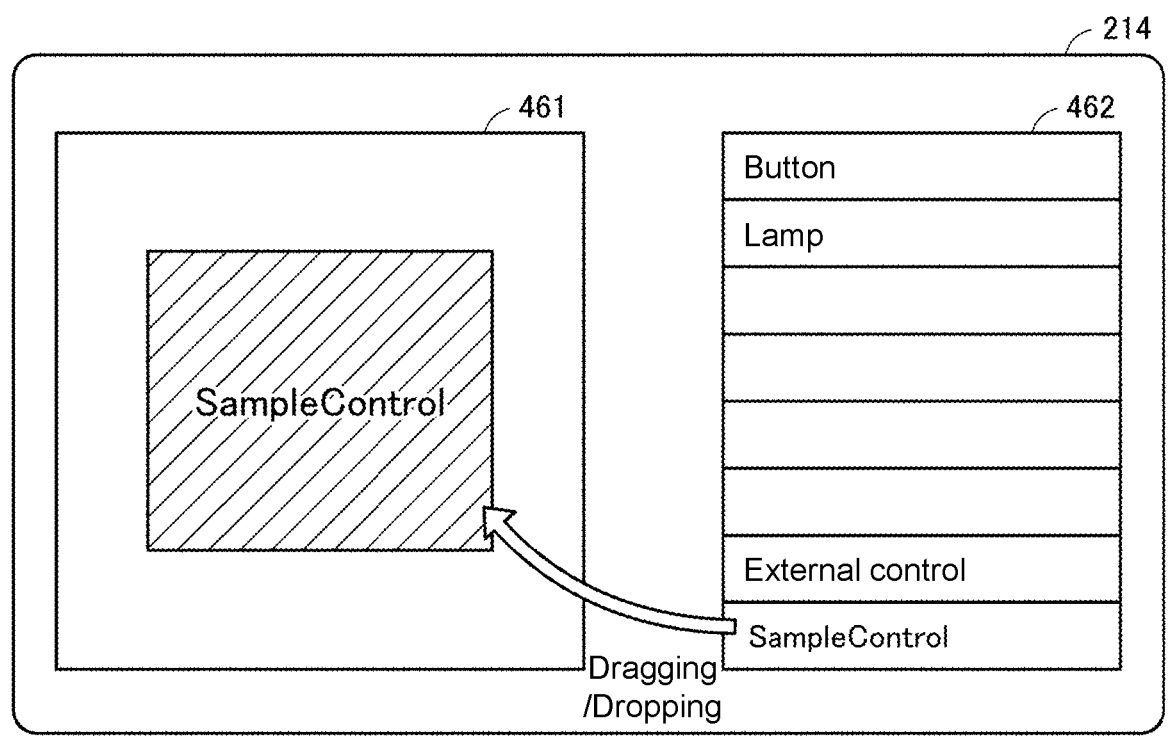
FIG. 10 is a diagram schematically showing an example of a display screen at the time of editing the HMI program according to an embodiment of the disclosure.
FIG. 11 is a diagram illustrating a part of the internal code of the HMI program 112 according to an embodiment of the disclosure.

FIG. 7 is a diagram schematically showing an outline of a toolbox management process according to an embodiment of the disclosure. FIG. 10 is a diagram schematically showing an example of a display screen at the time of editing the HMI program according to an embodiment of the disclosure. FIG. 11 is a diagram illustrating a part of the internal code of the HMI program 112 according to an embodiment of the disclosure.

(h1. Editing Process)

In the embodiment, when the editor 309 edits the HMI program 112, for example, an editor screen shown in FIG. 10 is displayed on the display 214. In the embodiment, the HMI program 112 includes a page-by-page program corresponding to the HMI screen. The HMI program 112 is configured by multiple pages, and a page 461 of the HMI program and a toolbox 462 are displayed on the editor screen. The data in the toolbox 462 is stored in, for example, the RAM 206, and is read from the RAM 206 by the editor 309 and displayed when the HMI program is edited.

With reference to FIG. 10, the toolbox 462 corresponds to a part for outputting a list of selection candidates of the UI elements by being displayed on the display 214. Specifically, this list includes a list of identifiers, such as names of the UI elements, which can be used to edit the HMI program 112.

The UI elements that are registrable in the toolbox 462 may include a user-defined UI or a system-defined UI for the HMI of FA and the external control 501. The UI elements may include GUI elements such as a button and a lamp.

When editing the page 461, the user operates the input part 211 to select a UI element from the toolbox 462, moves the selected UI element to a desired position on the page 461 by a dragging operation, and performs a dropping operation. The editor 309 receives the dragging/dropping operation and edits (creates) the page 461 so that the selected UI element is incorporated into the HMI program of the page 461. The user can switch to display another page 461 and edit it in the same manner by a switching operation on the page 461 of the display 214. In this way, the user can edit the HMI program 112 by performing an operation of arranging the UI elements on the page 461 without inputting a program code.

For example, when the external control 501 is selected as a UI element configuring the page 461, the code for calling the external control 501 after the I/F conversion is added to the source code of the page 461. For example, as shown in FIG. 11, the editor 309 adds a call code of the external control 501 using the name of "converted_SampleControl" in which converted_is added to the name of the external control 501.

(h2. Registration of Toolbox 462)

Next, a configuration for registering the external control 501 in the toolbox 462 used in the above-mentioned editing process will be described.

With reference to FIG. 7, the development environment 42 includes an external control file selection part 427, the external control converter 425 including a wrapper generation part 428, and a toolbox management part 391. The user operates the input part 211 to select the function of importing the external control 501 from a function menu 426. The external control file selection part 427 searches for the executable code file ("SampleControl.dll") of the external control 501 selected from the RAM 206 based on the external control import instruction 425K according to the corresponding selection operation of the user.

The external control converter 425 outputs to the toolbox management part 391 a registration request of "SampleControl" (which is the file name of the external control 501) to the toolbox 462. The toolbox management part 391 corresponds to a registration part for registering a UI element of the program code compatible with Windows, that is, the external control 501, which is received from the user operation via the input part 211 in a list of UI element candidates of the toolbox 462. In this case, the toolbox management part 391 registers the name "SampleControl" of the external control 501 in the toolbox 462. As a result, the external control 501 selected by the user can be registered in the list of the toolbox 462 as a candidate of the UI elements that can be used for editing the HMI program 112.

I. EXTERNAL CONTROL CONVERSION PROCESS

Figure 8:
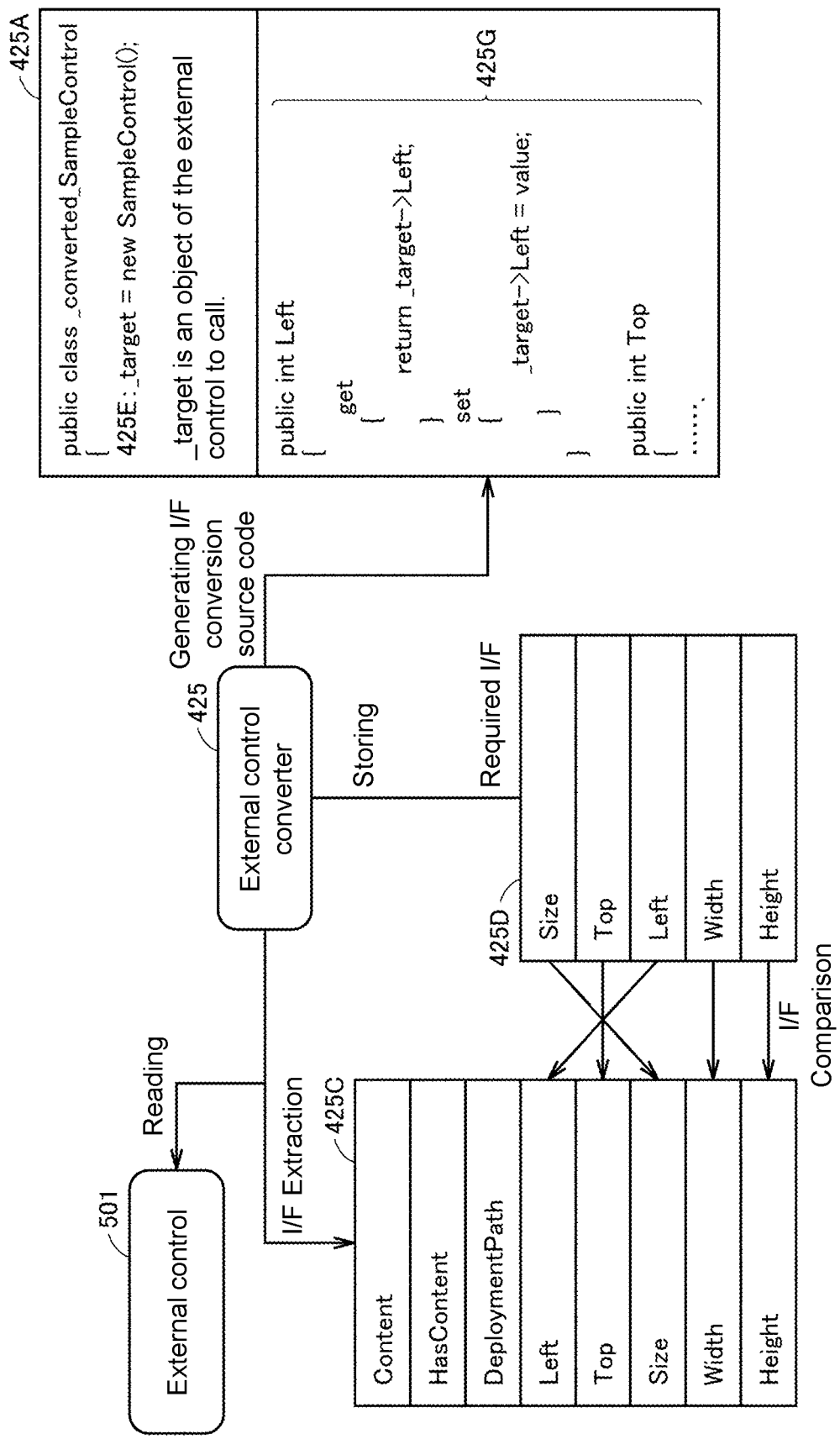
FIG. 8 is a diagram schematically showing an example of a process for generating an I/F conversion source code according to an embodiment of the disclosure.

FIG. 8 is a diagram schematically showing an example of a process for generating an I/F conversion source code according to an embodiment of the disclosure. FIG. 9 is a diagram schematically showing an example of an I/F conversion object according to an embodiment of the disclosure.

(i1. Generation of I/F Conversion Source Code)

The external control converter 425 executes an I/F conversion source code generation process. Specifically, the external control converter 425 generates the I/F conversion source code 425A from the code of the file "SampleControl.dll" of the external control 501 registered in the toolbox 462. Further, the external control converter 425 compiles the I/F conversion source code 425A to generate the I/F conversion object 425B. The I/F conversion object 425B has an instruction code (script or the like) for calling the file "SampleControl.dll" of the external control 501.

First, with reference to FIG. 8, the external control converter 425 reads the code of the file "SampleControl.dll" of the external control 501, analyzes the read code, and extracts an interface (I/F) 425C from the code based on the analysis result. Further, the external control converter 425 compares the I/F 425C with a required I/F 425D. This "I/F" is an attribute possessed by the external control 501 or the UI element, and may include, for example, a display attribute (color, size, and the like) or a communication attribute for exchanging data with other UI elements, other programs, and the like. The required I/F 425D indicates an I/F including properties required as the UI element of the HMI of FA. More typically, it indicates an I/F including properties of a UI element represented by a program code compatible with a non-Windows OS. Further, data of the required I/F 425D is held (stored) in the RAM 206 or the like.

Based on the result of the I/F comparison, the external control converter 425 extracts the properties (type and number of the attributes) that match the properties included in the required I/F 425D from the properties of the extracted I/F 425C. The external control converter 425 uses the extracted (matching) properties to generate a source code 425G for presenting the external control 501 as a UI element for the HMI of FA, i.e., as a UI element compatible with a non-Windows OS. The I/F conversion source code 425A includes a name 425E of the called external control 501 and the converted (generated) source code 425G.

(i2. Generation of I/F Conversion Object 425B)

The wrapper generation part 428 of the external control converter 425 generates, for example, the I/F conversion object 425B of FIG. 9 by compiling the I/F conversion source code 425A. The I/F conversion object 425B of FIG. 9 has the form of a wrapper program. That is, the I/F conversion object 425B includes a source code 425H which is interpretable and executable by Windows, the source code 425G which is interpretable and executable by a non-Windows OS, and a wrapper part 500.

The source code 425H includes a name of the external control 501 to be called and a code instructing the Runtime 513 under the Windows 512 to call and execute the external control 501.

The source code 425G includes a code instructing the Runtime under the non-Windows OS to generate an object module of a UI element compatible with the non-Windows OS from the source code 425H.

The I/F conversion object 425B is not a file configured by an executable code dynamically linked to the execution module of the HML program such as "SampleControl.dll" of the external control 501, but may be said to be an intermediate code which is converted into an object module configured by an executable code by executing the source code 425G.

When executed, the wrapper part 500 includes a code which causes the Runtime of the control device 100 to determine the OS type and instructs switching of whether to generate an execution module by the source code 425H based on the determined OS type. More specifically, when this code is executed, when the condition that the OS type is Windows is satisfied, an execution module of the HMI program 112 including the external control 501 provided by the OS (Windows 512) of the control device 100 is generated. On the other hand, when the condition that the determined OS type is non-Windows is satisfied, the source code 425G is executed. As a result, an execution module of the HMI program 112 including the executable code of the source code 425G is generated in order to realize a control (UI element) that replaces the external control 501.

By executing the wrapper part 500 in this way, an execution module compatible with Windows including the external control 501 and an execution module compatible with a non-Windows OS including an alternative external control instead of the external control 501 can be generated from the source code of the same HMI program 112.

In the embodiment, the time when the external control converter 425 generates the I/F conversion object 425B is not particularly limited. For example, the external control converter 425 generates the I/F conversion object 425B (wrapper program) when the executable format program is generated from the HMI program 112 by the compiler 506.

In this way, the I/F conversion object 425B can be generated in one time. That is, when the HMI program 112 is edited, there is a background that the UI elements configuring the HMI program 112 are frequently changed by trial and error. With such a background taken into consideration, if the I/F conversion object 425B is generated at the time of editing, the generation will be repeated relatively frequently. On the other hand, if the I/F conversion object 425B is generated when the HMI program 112 is compiled, the generation of the I/F conversion object 425B can be completed in one time at the time of compilation as described above.

Further, at another time, the external control converter 425 can also generate the I/F conversion object 425B when the external control 501 is registered in the toolbox 462 by the toolbox management part 391. In this case, since it is not necessary to generate the I/F conversion object 425B when compiling the HMI program 112, the time required for compiling can be shortened.

J. EXTERNAL CONTROL IMPORT PROCESS

Figure 12:
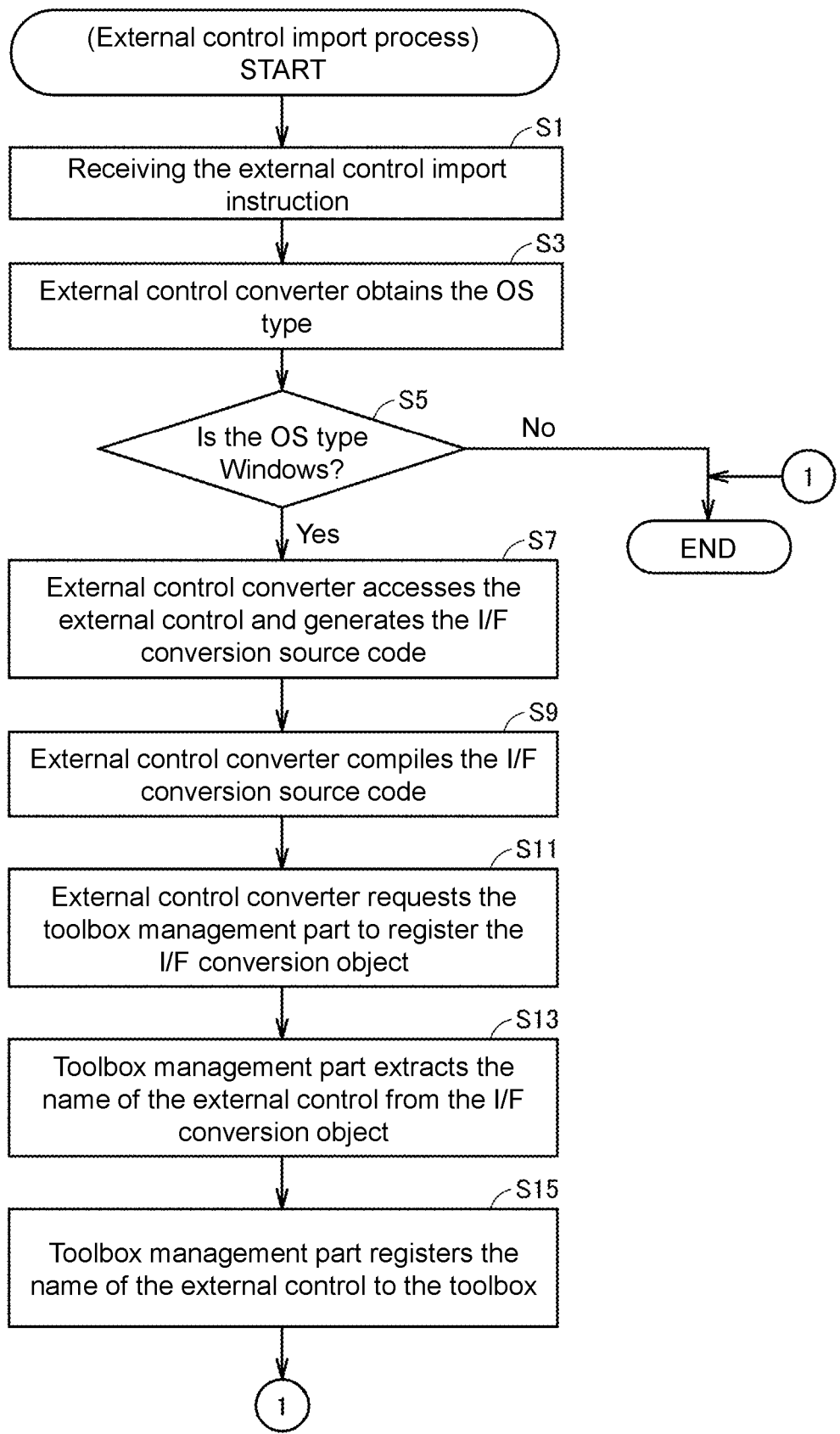
FIG. 12 is a flowchart schematically showing an example of a process of importing the external control 501 into the development environment 42 according to an embodiment of the disclosure.

FIG. 12 is a flowchart schematically showing an example of a process of importing the external control 501 into the development environment 42 according to an embodiment of the disclosure. A process of importing the external control 501 as a UI element that is usable in the development environment 42 will be described with reference to FIG. 7 according to the flowchart of FIG. 12.

With reference to FIG. 12, when the external control converter 425 receives the external control import instruction 425K from the user operation via the input part 211 (Step S1), the external control converter 425 obtains the OS type of the target device stored by the OS type storage part 424 (Step S3), and determines whether the OS type indicates Windows (Step S5). When the external control converter 425 determines that the OS type indicates non-Windows (NO in Step S5), the external control converter 425 ends a series of processes.

On the other hand, when the external control converter 425 determines that the OS type indicates Windows (YES in Step S5), the external control converter 425 generates the I/F conversion source code 425A according to the procedure of FIG. 8, and the external control converter 425 stores the generated I/F conversion source code 425A in the RAM 206 according to the procedure of FIG. 8 (Step S7).

The external control converter 425 compiles the I/F conversion source code 425A and obtains the I/F conversion object 425B from the I/F conversion source code 425A (Step S9).

The external control converter 425 requests the toolbox management part 391 to register the I/F conversion object 425B (Step S11). Upon receiving the registration request, the toolbox management part 391 extracts the name of the external control 501 from the I/F conversion object 425B (Step S13), and adds (registers) the name of the extracted external control 501 to the data of the toolbox 462 of the RAM 206 (Step S15). After that, the process ends. Further, the name of the external control 501 registered in the toolbox 462 is associated with the corresponding I/F conversion object 425B of the RAM 206.

K. EDITING AND COMPILING PROCESS

Figure 13:
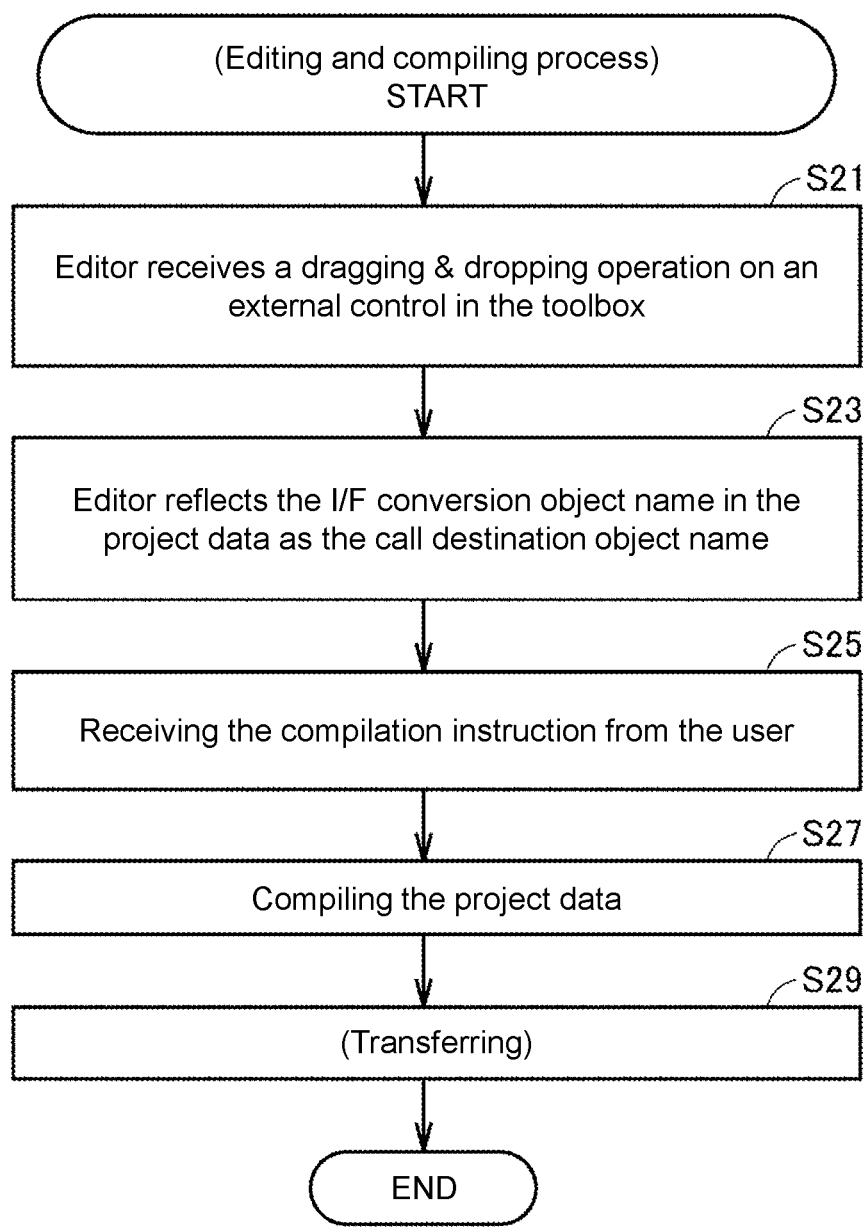
FIG. 13 is a flowchart showing an example of a process of editing and compiling according to an embodiment of the disclosure.

FIG. 13 is a flowchart showing an example of a process of editing and compiling according to an embodiment of the disclosure. Editing the HMI program by the editor 309 and compiling the HMI program in the development environment 42 will be described with reference to the flowchart of FIG. 13. At the time of editing, the HMI program 112 and the toolbox 462 are displayed on the display 214 as shown in FIG. 10.

With reference to FIG. 13, the editor 309 receives via the input part 211 a dragging/dropping operation for incorporating an external control with a name selected by the user from the toolbox 462 into the HMI program as a UI element (Step S21).

The editor 309 reflects the object name of the I/F conversion object 425B of the RAM 206 associated with the external control selected by the user in the project data of the HMI program 112 as the call destination object name according to the received user operation content (Step S23). As a result, it is possible to incorporate the external control into the HMI program 112 as a UI element configuring the program.

When the development environment 42 receives the compilation instruction 421A of the HMI program from the user via the input part 211 (Step S25), the development environment 42 starts the compilation execution part 421.

The compilation execution part 421 starts the WinApp compiler 423 and the HMI compiler 422 in order to compile the project data of the HMI program 112. The WinApp compiler 423 scans the HMI program, compiles the I/F conversion source code of the external control 501 among the UI elements configuring the HMI program, and the HMI compiler 422 compiles the source code of the HMI program 112 (Step S27).

By compiling the HMI program 112 in this way, an executable code is generated from the source code of the HMI program 112. At the time of compiling, the compiler scans the HMI program 112, and when it detects a call instruction for the external control, it extracts the name of the external control from the call instruction. The compiler searches the RAM 206 for the I/F conversion object 425B associated with the name of the extracted external control, and generates the executable code of the HMI program 112 including the searched I/F conversion object 425B.

The development environment 42 transfers the HMI program configured by the executable code obtained by compilation (Step S29). This transfer includes concepts such as transfer (download) via a transmission path to the control device 100, which is a target device, or storage in a storage part such as the RAM 206 or the recording medium 250.

L. EXECUTION OF HMI PROGRAM ON TARGET DEVICE

Figure 14:
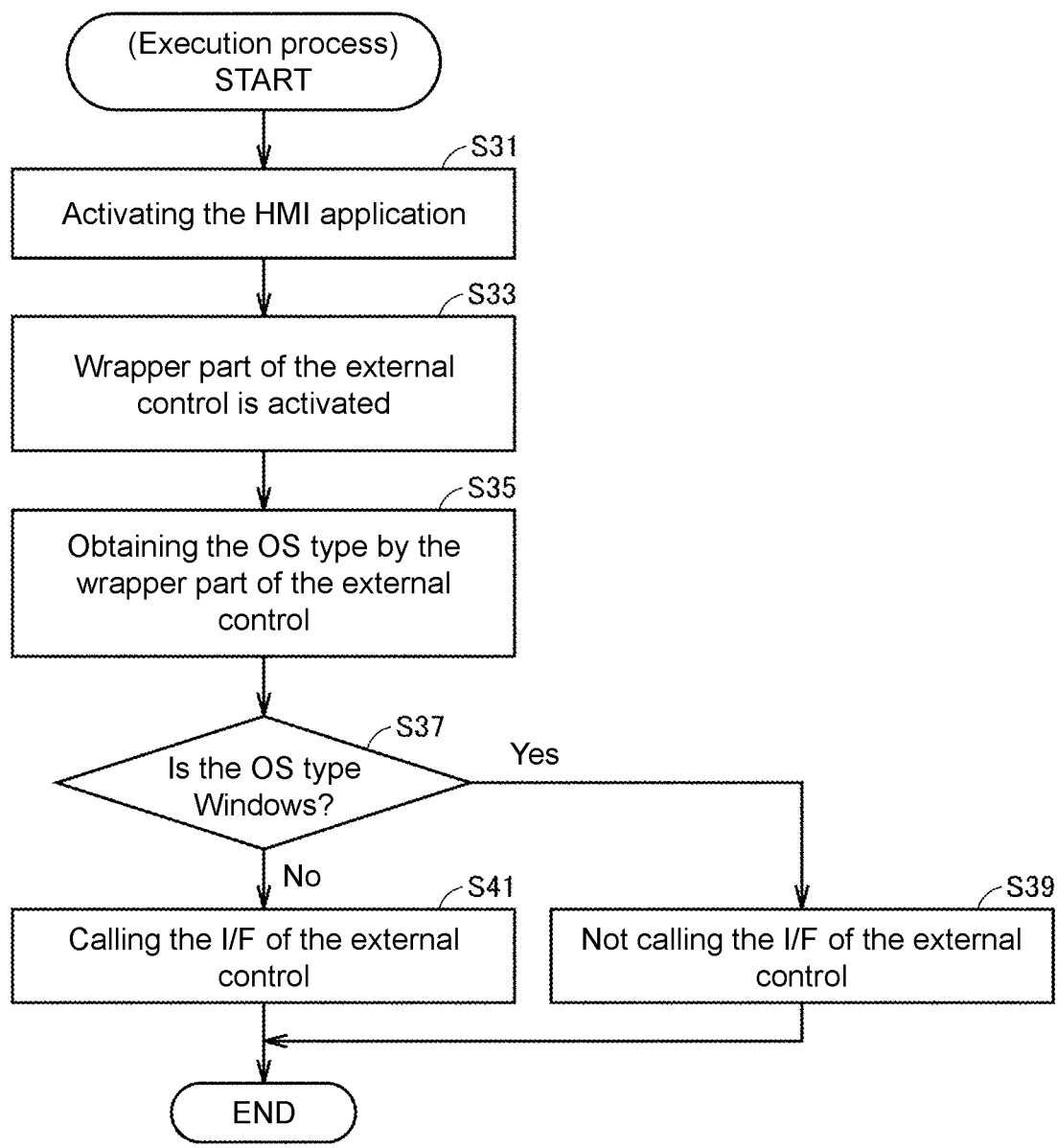
FIG. 14 is a flowchart showing an example of a process of an external control at the time of executing an HMI program according to an embodiment of the disclosure.

FIG. 14 is a flowchart showing an example of a process of an external control at the time of executing an HMI program according to an embodiment of the disclosure.

With reference to FIG. 14, in the control device 100, the Runtime 513 activates and executes the HMI program 112 in executable code (Step S31).

When the call instruction of the external control is executed while the HMI program 112 is being executed, the Runtime 513 activates the wrapper part 500 in the wrapper program of the external control (Step S33). When the wrapper part 500 is activated, the Runtime 513 executes subsequent processes of Steps S35, S37, S39 and S41 while interpreting the instruction code of the wrapper part 500. As a result, an execution module configured by the executable code of the HMI program 112 is generated.

Specifically, the Runtime 513 obtains the OS type which executes the Runtime 513 (Step S35). For example, the OS type can be obtained by reading from a predetermined storage area.

The Runtime 513 determines whether the obtained OS type is Windows (Step S37). When the Runtime 513 determines that the OS type is Windows (YES in Step S37), it generates the execution module 600 for presenting the UI element by the external control 501 without calling the I/F conversion source code 425G of the wrapper program (Step S39).

On the other hand, when the Runtime 513 determines that the OS type is non-Windows (NO in Step S37), it interprets and executes the I/F conversion source code 425G (Step S41). In this way, the Runtime 513 generates the execution module 700 for presenting a UI element according to the I/F conversion source code 425G (Step S39).

According to the process of FIG. 14, by executing the HMI program 112, the execution module 600 compatible with Windows including the external control 501 and the execution module 700 compatible with a non-Windows OS which is generated with the I/F conversion source code 425G replacing the external control 501 can be generated from the source code of the same HMI program 112.

M. PROGRAM

A support program for executing various processes under the development environment 42 including the processes of each flowchart shown in the embodiment is stored in the storage part (the ROM 204, the RAM 206, the HDD 208, the recording medium 250, and the like) of the support device 200. By reading the support program from the storage part and executing it, the CPU 202 can realize various processes in the development environment 42 described in the embodiment.

Such a support program is recorded on a computer-readable recording medium such as a flexible disk, a compact disk-read only memory (CD-ROM), a ROM, a RAM and the recording medium 250 attached to the support device 200, and it can also be provided as a program product. Alternatively, the program can be provided by being recorded on a recording medium such as the HDD 208 built in the support device 200. Further, the program can also be provided by being downloaded from a network (not shown) via the communication interface 218.

N. APPENDIX

The embodiments as described above include the following technical concepts.

[Configuration 1]

A support device (200) which supports development of a human machine interface (HMI) program (112) to be executed by a target device (100) of factory automation (FA), the support device including:
 a receiving part (211) which receives specification of a user interface (UI) element configuring the HMI program with a program code compatible with a first type of operation system (OS);
 a code generation part (425) which generates a program code (425A) of a UI element compatible with a second type of OS from the specified UI element; and
 a wrapper generation part (428) which generates a wrapper program (425B) comprising the generated program code compatible with the second type of OS and an instruction code (500) which instructs to generate an execution module that comprises the program code when a condition that an OS possessed by the target device is not the first type of OS is satisfied,
 wherein a program in executable code is generated from the HMI program in which the wrapper program is incorporated as a UI element with the program code compatible with the first type of OS.

[Configuration 2]

The support device according to configuration 1, wherein the wrapper generation part further includes, in the instruction code, a code (425E) which instructs to generate an execution module of an HMI program comprising the UI element with the program code compatible with the first type of OS when a condition that the OS possessed by the target device is the first type of OS is satisfied.

[Configuration 3]

The support device according to configuration 1 or configuration 2, wherein the code generation part
 extracts a property which matches a property of the UI element with the program code compatible with the second type of OS from a property of the UI element of the program code compatible with the first type of OS, and
 generates the UI element with a program compatible with the second type of OS of a UI element with a program code comprising the extracted property.

[Configuration 4]

The support device according to any one of configurations 1 to 3, further including:
 a part (462) which outputs a list of selection candidates of the UI elements; and
 a registration part (391) which registers the UI element with the program code compatible with the first type of OS received by the receiving part in the list,
 wherein the HMI program is edited by using a UI element selected by a user from the list.

[Configuration 5]

The support device according to configuration 4, wherein the wrapper generation part generates the wrapper program when the program in executable code is generated by the execution format generation part.

[Configuration 6]

The support device according to configuration 4, wherein the wrapper generation part generates the wrapper program when the UI element with the program code compatible with the first type of OS is registered in the list by the registration part.

[Configuration 7]

The support device according to any one of configurations 1 to 6, wherein the code generation part generates the UI element with a program code compatible with the second type of OS from the specified UI element when a type of the OS possessed by the target device is not the first type of OS.

[Configuration 8]

A non-transient computer-readable recording medium, recording a support program (710) which supports development of a human machine interface (HMI) program (112) to be executed by a target device (100) of factory automation (FA),
 wherein the support program is configured to make a computer (200) execute:
 receiving specification of a user interface (UI) element configuring the HMI program (S21) with a program code compatible with a first type of operation system (OS);
 generating a program code compatible with a second type of OS from the specified UI element (S7);
 generating a wrapper program comprising the generated program code compatible with the second type of OS and an instruction code which instructs to generate an execution module that comprises the program code when a condition that an OS possessed by the target device is not the first type of OS is satisfied (S9); and
 generating a program in executable code from the HMI program in which the wrapper program is incorporated as a UI element with the program code compatible with the first type of OS (S27).

The embodiments disclosed herein are exemplary and should not be construed restrictive in all aspects. The scope of the disclosure is defined by the claims instead of the above descriptions, and it is intended to include the equivalents of the scope of the claims and all modifications within the scope.

What is claimed is:

1. A support device which supports development of a human machine interface (HMI) program to be executed by a target device of factory automation (FA), the support device comprising:
 a receiving part which receives specification of a user interface (UI) element, wherein the UI element configures the HMI program with a program code compatible with a first type of operation system (OS);
 a code generation part which generates a program code of a UI element compatible with a second type of OS from the specified UI element; and
 a wrapper generation part which generates a wrapper program comprising the generated program code compatible with the second type of OS and an instruction code which instructs to generate an execution module that comprises the program code when a condition that an OS possessed by the target device is not the first type of OS is satisfied,
 a part which outputs a list of selection candidates of the UI elements; and
 a registration part which registers the UI element with the program code compatible with the first type of OS received by the receiving part in the list,
 wherein a program in executable code is generated from the HMI program in which the wrapper program is incorporated as a UI element with the program code compatible with the first type of OS, and wherein the HMI program is edited by using a UI element selected by a user from the list.

2. The support device according to claim 1, wherein the wrapper generation part further comprises, in the instruction code, a code which instructs to generate an execution module of an HMI program comprising the UI element with the program code compatible with the first type of OS when a condition that the OS possessed by the target device is the first type of OS is satisfied.

3. The support device according to claim 1, wherein the code generation part
   extracts a property which matches a property of the UI element with the program code compatible with the second type of OS from a property of the UI element of the program code compatible with the first type of OS, and
   generates the UI element with a program code compatible with the second type of OS from a UI element with a program code comprising the extracted property.

4. The support device according to claim 1, wherein the wrapper generation part generates the wrapper program when the program n executable code is generated.

5. The support device according to claim 1, wherein the wrapper generation part generates the wrapper program when the UI element with the program code compatible with the first type of OS is registered in the list by the registration part.

6. The support device according to claim 1, wherein the code generation part generates the UI element with a program code compatible with the second type of OS from the specified UI element when a type of the OS possessed by the target device is not the first type of OS.

7. A non-transient computer-readable recording medium, recording a support program which supports development of a human machine interface (HMI) program to be executed by a target device of factory automation (FA),
   wherein the support program is configured to make a computer execute:
   receiving specification of a user interface (UI) element, wherein the UI element configures the HMI program with a program code compatible with a first type of operation system (OS);
   generating a program code compatible with a second type of OS from the specified UI element;
   generating a wrapper program comprising the generated program code compatible with the second type of OS and an instruction code which instructs to generate an execution module that comprises the program code when a condition that an OS possessed by the target device is not the first type of OS is satisfied;
   outputting a list of selection candidates of the UI elements;
   registering the UI element with the program code compatible with the first type of OS received by the receiving part in the list; and
   generating a program in executable code from the HMI program in which the wrapper program is incorporated as a UI element with the program code compatible with the first type of OS.

* * * * *